(No Model.)

D. F. GERBEREUX.
CHOCOLATE DIP OR COATING TRAY.

No. 522,788. Patented July 10, 1894.

WITNESSES:
L. N. Legendre
Alfred Beattie Jr.

INVENTOR
Denis F. Gerbereux
BY
Stephen J. Cox
ATTORNEY

UNITED STATES PATENT OFFICE.

DENIS F. GERBEREUX, OF NEW YORK, N. Y.

CHOCOLATE DIP OR COATING TRAY.

SPECIFICATION forming part of Letters Patent No. 522,788, dated July 10, 1894.

Application filed March 20, 1894. Serial No. 604,393. (No model.)

*To all whom it may concern:*

Be it known that I, DENIS F. GERBEREUX, a citizen of the United States, residing at New York, State and county of New York, have invented a new and useful Improvement in Chocolate Dip or Coating Trays, of which the following is a full and true description, enabling others skilled in the art to which it appertains to make and use the same.

My invention relates to confectioners' machines and more especially to such as are used in making bonbons or chocolate coated candies. Its object is to enable a workman to coat a large number of bonbons or other candies at once and in such a manner as to be uniform in appearance and size.

Figure 1:
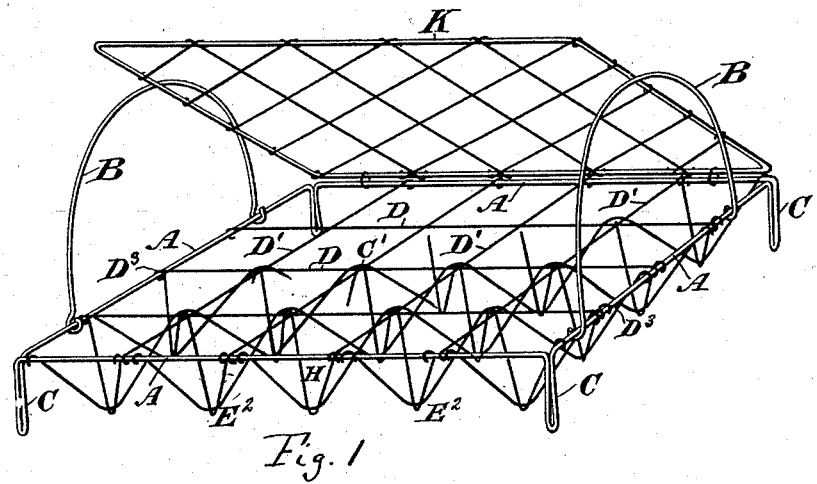
Figure 2:
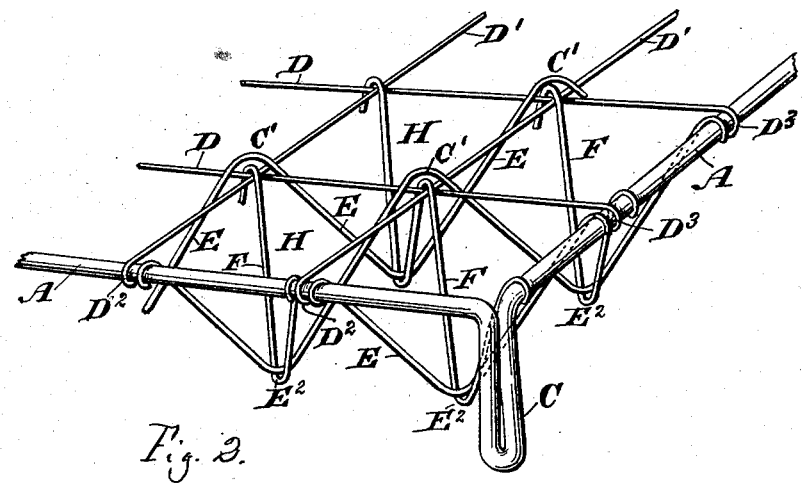
Figure 3:
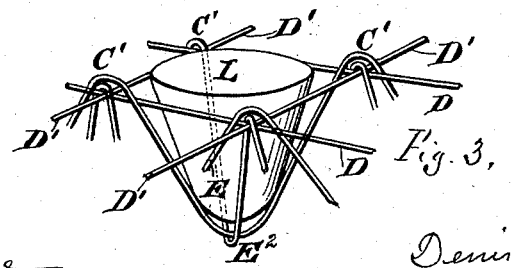

In the accompanying drawings in which like letters refer to like parts in each, Figure 1 is a perspective view of a tray with cover. Fig. 2 is a detail of the same enlarged. Fig. 3 is a perspective view of a bon bon in position in one of the pockets.

In the drawings A represents a frame having adjustable handles B. B.; these handles may in some cases be dispensed with; this frame has legs C. C. to admit of its being elevated a proper distance above the bench upon which it may stand.

Across the top of the frame A at proper intervals are ranged two series of wires D and D'; these wires are attached to the frame A at their ends $D^2$ and $D^3$ and cross each other at right angles, forming squares over the surface of the tray or square formed by the frame A, the top of the frame is thus divided into uniform meshes of any desired size. Two wires E and F are also attached to the frame A; these wires are bent in return bends, so as to form when placed in position and at right angles to each other, baskets or pockets H. H. in each of the meshes formed by the wires D and D'. The wires E and F pass over and may be attached to the wires D and D' at the point C', where they bisect each other and dip down and cross each other at the bottom of the pocket H at the point $E^2$; this is shown in Fig. 2.

In Fig. 1 a cover K is shown attached to the tray; this cover may be dispensed with in some cases or it may be detached from the tray proper; it may be made of wire mesh as shown, or in other ways and effect the purpose desired, which is to prevent the bon bons prematurely falling out, and act as a cooling tray for them after being coated.

It is obvious that the shape of the mesh and form of the pocket can be changed by adjusting the several wires at other angles than those described.

The operation of this device is as follows: The bon bon L to be coated is first formed in a mold or by hand, of such a shape as to conform to the shape of one of the pockets; it is then placed in the pocket as shown in Fig. 3, when all the pockets are filled, or as many of them as may be required, the dip frame containing the bon bons L is raised by means of the handles and immersed in the chocolate or other preparation with which they are to be coated; the preparation will adhere to the outer surface of the bon bon at once; the frame is now raised from the coating preparation, allowed to drip and cool for a short time and then turned over, as in turning the dip tray over, some of the bon bons might fall out prematurely and become fractured; the cover K is placed over the top, either by means of hinges as shown or otherwise and the dip tray smartly struck upon the bottom; this compels the bon bons to drop out of the pockets and fall upon the cover K in well arranged rows and groups where they are permitted to remain and dry before handling.

Wire is preferably used in the construction of this tray, but it may be cast or made of other materials; so long as the features herein described are adhered to the principle will be the same.

Having thus described my invention, what I claim as new, and desire to secure by Letters Patent, is—

1. The combination in a dip tray for bon bons of the frame A, with handles B, mesh wires D, and D', crossing said frame at right angles to each other, pockets H formed within the mesh of said wires, and legs C, formed upon the frame A, as herein shown and described.

2. The combination in a bon bon dip tray of the pockets H, frame A and cover K as herein shown and described.

3. The combination in a bon bon dip tray of the frame A having formed within its perimeter a series of baskets made of return bends of wire crossing said frame transversely the ends of said wire connected to said frame, handles B and legs C as herein shown and described.

DENIS F. GERBEREUX.

Witnesses:
ALFRED BEATTIE, Jr.,
HOWARD COX.